United States Patent Office 2,938,861
Patented May 31, 1960

2,938,861

REFINING OF LIGHT OIL WITH A MIXTURE OF SULFURIC ACID, PROPIONALDEHYDE, AND ACETALDEHYDE

Herbert J. Drake, Nazareth, Pa., assignor to Bethlehem Steel Company, a corporation of Pennsylvania No Drawing. Filed July 18, 1958, Ser. No. 749,338

11 Claims. (Cl. 208—220)

This invention relates to the removal of sulfur from hydrocarbon oils and, more particularly, to a method for the removal of thiophenes from the light oil produced in coke manufacture.

The light oil which is produced and scrubbed from coke oven gas, in the manufacture of metallurgical coke, contains benzene, toluene and mixed xylenes, commonly known as BTX, which are reclaimed from the scrubbing medium and separated by distillation. The light oil also contains certain impurities, chiefly organic sulfur compounds, saturated and unsaturated aliphatic compounds such as paraffins and olefines, and saturated and unsaturated naphthenic compounds, of which cyclohexane and cyclohexene are examples. Before distillation, to separate the three end products of benzene, toluene and xylene, the light oil is customarily freed of fore-runnings, or low-boiling compounds, and washed with sulfuric acid, followed by a neutralizing caustic wash. The sulfuric acid wash removes the bulk of the unsaturated contaminating compounds from the oil, the oil then containing contaminating saturated compounds, a certain amount of sulfur compounds and a small amount of unsaturates. The chief sulfur impurities at this stage are thiophene and its methyl homologs. Usually the total thiophene content in the washed light oil will run between 300 and 400 p.p.m. Repeated acid washing to reduce this figure below 1 p.p.m. would result in excessive loss of aromatics.

In the utilization of nitration grade benzene and nitration grade toluene, the presence of thiophenes often proves quite objectionable, especially where the products are used in catalytic synthesis. Thiophene has the ability to poison certain types of catalysts used in these reactions, thus rendering the catalyst practically useless within a short space of time. In certain processes, such as those in which benzene is used in the manufacture of aniline and in which toluene is used for making polyurethane, the aromatics often have specifications requiring the presence of less than 1 p.p.m. thiophene.

Numerous methods have been proposed for the removal of thiophene from benzene and from light oil. Often the proposed method is only practical with a refined product, such as nitration grade benzene. The use of certain aldehydes, such as acetaldehyde and formaldehyde, has been proposed for the treatment of benzene, but use of these aldehydes alone is unsatisfactory when treating crude light oil.

To remove thiophenes from a crude mixture of light oil, i.e. the oil mixture before distillation, requires a process that is operable in the presence of the residual unsaturates left after the usual acid washing. Because these unsaturates are more reactive than thiophenes, they will be the first to form condensation products with aldehydes. With acetaldehyde, these condensation products are of such high molecular weight structure that they are insoluble in sulfuric acid. This presents great practical difficulties, for these insoluble products form a tarry sludge which does not drain readily. Furthermore, the sludge sticks to the walls of the treatment vessel, or agitator. In addition, appreciable light oil is entrained in this sludge. Formaldehyde is so reactive that it forms sludges under all conditions, even when unsaturates are not present.

One of the objects of this invention is to remove thiophenes from light oil before separation of the light oil products by distillation.

I have found that substantially thiophene-free benzene and toluene can be produced by treating an acid washed, caustic-neutralized light oil with a special combination of aldehydes. My method comprises adding to the acid-washed, neutralized light oil, a quantity of sulfuric acid, propionaldehyde and acetaldehyde. The resultant mixture is agitated for a sufficient time to react with substantially all of the unsaturates remaining in the oil after the acid wash, and at least 99% of the thiophene, or thiophenes. Upon settling, the liquid mixture forms two liquid layers, an acid layer surmounted by an oil layer.

During agitation of the liquid mixture, the aldehydes react with the thiophenes and the remaining unsaturates to form condensation products. By using a sufficient amount of propionaldehyde in the aldehyde mixture, the condensation products, formed by reaction between the aldehydes and the unsaturates remaining in the oil after the acid wash, are soluble in the sulfuric acid layer. When acetaldehyde alone is used, the resultant condensation products are high molecular weight compounds which do not readily dissolve in the sulfuric acid. Propionaldehyde alone is inadequate for removal of thiophenes to the lowest levels desired.

A series of laboratory tests has been made to demonstrate the equilibrium of the propionaldehyde-thiophenes condensation. Toluene was selected for these tests as it is free of unsaturates, and it is a single compound. This toluene (nitration grade) contained approximately 100 p.p.m. methyl thiophenes. The results of these tests are given in the following examples.

*Example I*

A quantity of 5 ml. of 66° Bé. sulfuric acid and 0.2 ml. of propionaldehyde was added to 250 ml. of nitration grade toluene. The mixture was stirred for 15 minutes, then settled, and the dark acid layer drained. After a sodium hydroxide wash, the toluene was distilled and assayed by a quantitative colorimetric reaction with isatin. The treated toluene contained 3.7 p.p.m. of 3-methyl thiophene.

*Example II*

The procedure of Example I was followed, except that the mixture was stirred for 30 minutes. The treated toluene contained 0.8 p.p.m. of 3-methyl thiophene.

*Example III*

The procedure of Example I was followed, except that the mixture was stirred for 60 minutes. The treated toluene contained 0.8 p.p.m. of 3-methyl thiophene.

*Example IV*

The procedure of Example I was followed, except that 0.4 ml. of propionaldehyde was used, and the mixture stirred for 30 minutes. The treated toluene contained 0.7 p.p.m. of 3-methyl thiophene.

*Example V*

In this test, the procedure of Example I was followed, except that 0.2 ml. of acetaldehyde was used in place of propionaldehyde. The treated toluene contained 0.06 p.p.m. of 3-methyl thiophene.

The results in the above examples were attained under the ideal conditions of the laboratory, and nitration grade toluene product was used in the tests, whereas in plant practice, where BTX is treated, the resultant thiophene values will necessarily be higher.

Depending upon the nature and quantity of unsaturates in the oil after the acid wash, it may be desirable to add propionaldehyde first, followed by agitation, and then add acetaldehyde followed by agitation. Generally this alternative method is the more desirable as it reduces the amount of propionaldehyde required. When the two aldehydes are added at the same time, there is a possibility that the acetaldehyde will react with the unsaturates more rapidly than the propionaldehyde, thus forming considerable undesirable sludge. To overcome the faster rate of reaction of the acetaldehyde, a larger quantity of propionaldehyde is preferable over that needed when the two aldehydes are added separately, with the propionaldehyde being added first.

In certain instances, it may be preferable to add sulfuric acid and propionaldehyde to the acid washed oil, followed by agitation, settling and separation of the oil and acid layers. Acetaldehyde and additional sulfuric acid may then be added, followed by the steps of agitation, settling and separation of the two liquid layers.

If it is desired to lower the thiophene content of the treated oil to an irreducible minimum, a further alternative may be applied to my method. After treating the oil with propionaldehyde and acetaldehyde and separating the settled acid layer from the oil layer, a further addition of sulfuric acid and acetaldehyde may be made, followed by agitation and separation of the oil and acid layers. By including this additional acetaldehyde treatment, the total thiophenes, remaining in the treated oil, can be reduced economically to less than 0.7 p.p.m.

The principal application of my method is in the treatment of BTX oil, for when treating benzene, toluene, or toluene-xylene (T-X) separately, acetaldehyde may be used alone as treating material, as unsaturates are not normally present in the distilled aromatics. However, if benzene and toluene are treated separately for thiophenes, they have to be redistilled, with resultant increase in cost of the operation. By treating BTX oil with propionaldehyde and acetaldehyde, the BTX has to be treated only once in the agitator, and one distillation for each fraction is sufficient.

The following example is illustrative of the manner in which my invention may be performed.

A test run was made using carbon bisulfide-free light oil from an operating by-product coke plant. The light oil had been given the conventional acid washing and a caustic (soda) wash procedure.

To a quantity of 7500 gallons of the oil, remaining in the agitator after the conventional wash, was added 100 gallons of 66° Bé. sulfuric acid, and propionaldehyde in the amount of 20 gallons. The charge was agitated for 10 minutes to permit substantial completion of the condensation reaction between propionaldehyde and the unsaturates present in the oil. Acetaldehyde was then added to the agitator in an amount of 15 gallons. Agitation was resumed for 15 minutes to permit the condensation reaction between the aldehydes and the thiophenes present in the oil. The charge was allowed to settle for a period of 20 minutes, after which the acid layer was drained from the agitator. No sludge accompanied the settled liquids, consequently a clean separation was made between the oil and acid.

To the oil remaining in the agitator, a second portion of 66° Bé. sulfuric acid was added, in the amount of 40 gallons. A quantity of ten gallons of acetaldehyde was also added. The charge was agitated for 10 minutes and allowed to settle for 30 minutes. After settling, the acid layer was drained from the agitator.

The oil in the agitator was next neutralized by a caustic wash with 200 gallons of 18% sodium hydroxide, and agitated 15 minutes.

The oil layer was steam distilled in a residue column and then fractionated in a continuous benzene column. The toluene-xylene mixture from the bottom of the column was fractionated in a batch still. Both the benzene and the toluene fractions were 1° C. range products. The benzene fraction had a thiophene content of between 0.13 and 0.20 p.p.m. The toluene product had a total thiophenes content of less than 0.7 p.p.m. Thiophenes in the benzene and toluene were determined by a quantitative isatin colorimetric assay. The acid wash color for both end products was zero.

The amount of propionaldehyde needed for treatment depends on the quantity of unsaturates present in the acid washed, soda neutralized, light oil. For each 1000 gal. of washed BTX, the amount of propionaldehyde required may vary from 1 to 5 gal., the normal requirement being about 2.5 gal. In the event that propionaldehyde and acetaldehyde are added to the oil charge in the form of a mixture, the proportion of propionaldehyde may vary from 25% to 75%, a 33% to 50% proportion being found most useful. The necessary amount of acetaldehyde is dependent on the amount of thiophenes left in the BTX after the propionaldehyde reaction, and on the desired final thiophene level. The total amount of acetaldehyde used, when added separately, may range from 0.5 to 6 gallons per 1000 gallons of BTX, with from 2.5 to 3 gallons being an effective amount when used following an application of 2.5 gallons of propionaldehyde. The acetaldehyde requirements are quite flexible, for, if considerable propionaldehyde is used, and sufficient time is given for completion of the propionaldehyde reaction, the lower limit of acetaldehyde, i.e. 0.5 gal./1000 gal., may be sufficient to reduce the amount of thiophene to the desired level.

The amount of sulfuric acid required may vary from 3 gal. to 25 gal. for each 1000 gal. of BTX, with from 5 to 12.5 gal. normally proving the most efficient quantity. The sulfuric acid has two principal functions. The acid removes the water of reaction, thus permitting the condensation reaction, and it dissolves the condensation products formed with the thiophenes and unsaturates. In this invention the condensation products are soluble, or dispersed, in sulfuric acid, even though such products be formed in the presence of unsaturates. Materials other than sulfuric acid may be used to catalyze the condensation reaction, but a certain amount of acid must be present to dissolve the reaction products.

In the appended claims, it is to be understood that the acetaldehyde may be added at the same time as, or after, the propionaldehyde, but is in no instance added before the propionaldehyde.

I claim:

1. The method of treating acid washed light oil containing benzene and its homologs which comprises adding sulfuric acid, propionaldehyde and acetaldehyde to said oil, agitating the resultant mixture and settling the products of reaction formed and thereby forming an acid layer and an oil layer, and separating the two layers.

2. The method of treating acid washed light oil containing benzene and its homologs which comprises adding sulfuric acid, propionaldehyde and acetaldehyde to said oil, said acetaldehyde being added with or after the propionaldehyde, agitating the resultant mixture, setting the products of reaction formed and thereby forming an acid layer and an oil layer and separating the two layers.

3. The method of treating acid washed light oil containing benzene and its homologs which comprises adding sulfuric acid and propionaldehyde to said oil and agitating, then adding sulfuric acid and acetaldehyde and agitating, settling the products of reaction formed and thereby forming an acid layer and an oil layer and separating the two layers.

4. The method of treating light oil containing benzene and its homologs which comprises acid washing the oil followed by a caustic wash, adding sulfuric acid, propionaldehyde and acetaldehyde to said oil, agitating the resultant mixture and settling the products of reaction formed and thereby forming an acid layer and an oil layer, separating the two layers and caustic washing the oil layer.

5. The method of treating acid washed light oil containing benzene and its homologs which comprises, as a first step, adding sulfuric acid, propionaldehyde and acetaldehyde to said oil, agitating and settling the products of reaction formed and thereby forming an acid layer and an oil layer, and separating the two layers, then as a second step adding sulfuric acid and acetaldehyde to said oil layer, agitating and settling the products of reaction formed and thereby forming an acid layer and an oil layer, and separating the two layers.

6. The method of treating acid washed light oil containing benzene and its homologs which comprises adding sulfuric acid, at least 1 gallon of propionaldehyde per 1000 gallons of light oil and at least 0.5 gallon of acetaldehyde per 1000 gallons of light oil to said oil, agitating the resultant mixture, settling the products of reaction formed and thereby forming an acid layer and an oil layer, and separating the two layers.

7. The method of treating acid washed light oil containing benzene and its homologs which comprises, as a first step, adding sulfuric acid and propionaldehyde to said oil and agitating, then adding acetaldehyde and agitating, settling the products of reaction formed and thereby forming an acid layer and an oil layer, and separating the two layers, then as a second step adding sulfuric acid and acetaldehyde to said oil layer, agitating, settling the products of reaction formed and thereby forming an acid layer and an oil layer, and separating the two layers.

8. The method of treating light oil containing benzene and its homologs which comprises acid washing the oil followed by a caustic wash, adding sulfuric acid and propionaldehyde to said oil and agitating, adding acetaldehyde and agitating, settling the products of reaction formed, and thereby forming an acid layer and oil layer and separating the two layers, then adding sulfuric acid and acetaldehyde to said oil layer, agitating, settling the products of reaction formed and thereby forming an acid layer and an oil layer, and separating the two layers.

9. The method of treating light oil containing benzene and its homologs which comprises acid washing the oil followed by a caustic wash, adding sulfuric acid and propionaldehyde to said oil and agitating, adding acetaldehyde and agitating, settling the products of reaction formed and thereby forming an acid layer and an oil layer and separating the two layers, then adding sulfuric acid and acetaldehyde to said oil layer, agitating, settling the products of reaction formed and thereby forming an acid layer and an oil layer, separating the two layers and caustic washing the oil layer.

10. The method of treating light oil containing benzene and its homologs which comprises acid washing the oil followed by a caustic wash, adding sulfuric acid and propionaldehyde to said oil and agitating, adding acetaldehyde, agitating, settling the products of reaction formed and thereby forming an acid layer and an oil layer, and separating the two layers, then adding sulfuric acid and acetaldehyde to said oil layer, agitating and settling the products of reaction formed and thereby forming an acid layer and an oil layer, separating the two layers, caustic washing the oil layer and thereby producing an oil containing less than 0.7 p.p.m. of thiophenes.

11. The method of treating acid washed light oil containing benzene and its homologs which comprises adding sulfuric acid and propionaldehyde to said oil, agitating and settling the products of reaction formed and thereby forming an acid layer and an oil layer and separating the two layers, then adding sulfuric acid and acetaldehyde to said oil layer, agitating, settling the products of reaction formed and thereby forming an acid layer and an oil layer and separating the two layers.

References Cited in the file of this patent

UNITED STATES PATENTS

| | | |
|---|---|---|
| 1,776,039 | Metzger et al. | Sept. 16, 1930 |
| 2,397,077 | Alspaugh | Mar. 26, 1946 |
| 2,567,173 | Arundale et al. | Sept. 11, 1951 |
| 2,849,375 | Arundale et al. | Aug. 26, 1958 |